United States Patent
Wei

(10) Patent No.: US 6,844,285 B1
(45) Date of Patent: Jan. 18, 2005

(54) TRANSPARENT POLYCRYSTALLINE YTTRIUM ALUMINUM GARNET

(75) Inventor: George C. Wei, Weston, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/654,202

(22) Filed: Sep. 3, 2003

(51) Int. Cl.[7] .................................................. C03C 35/106
(52) U.S. Cl. ........................ 501/152; 501/153; 313/493; 313/636
(58) Field of Search .......................... 501/127, 152, 501/153; 313/480, 493, 636

(56) References Cited

U.S. PATENT DOCUMENTS

| | | | |
|---|---|---|---|
| 4,285,732 A | 8/1981 | Charles et al. ................ | 106/57 |
| 4,861,737 A | * 8/1989 | Prud'Homme van Reine et al. .......................... | 501/152 |
| 5,378,665 A | 1/1995 | Chen et al. .................... | 501/95 |
| 5,625,256 A | 4/1997 | Tiedt et al. ................... | 313/636 |
| 5,682,082 A | 10/1997 | Wei et al. ..................... | 313/636 |
| 5,861,714 A | 1/1999 | Wei et al. ..................... | 313/625 |

FOREIGN PATENT DOCUMENTS

| | | | | |
|---|---|---|---|---|
| EP | 0 926 106 A1 | 6/1999 | .......... | C04B/35/44 |
| GB | 2138802 A | * 10/1984 | .......... | C04B/35/50 |
| JP | 2001-158660 | 6/2001 | .......... | C04B/35/44 |

OTHER PUBLICATIONS

C. Greskovich and J.A. Brewer, *Solubility of Magnesia in Polycrystalline Alumina at High Temperatures*, J. Am. Ceram. Soc., 84 [2] 420–425 (2001).

N. Matsushita et al., *Precipitation and Calcination Processes for Yttrium Aluminum Garnet Precursors Synthesized by the Urea Method*, J. Am. Ceram. Soc., 82 [8] 1977–84 (1999).

H. Haneda et al., *Synthesis of Ytterbium Iron Garnet Powder by the Homogeneous Precipitation Method and its Sintering*, J. Japanese Ceramic Society, 98 [3] 285–91 (1990) (translated).

* cited by examiner

*Primary Examiner*—David Sample
(74) *Attorney, Agent, or Firm*—Robert F. Clark

(57) ABSTRACT

A transparent polycrystalline yttrium aluminum garnet (YAG) ceramic is described wherein the ceramic is colorless and transparent in both as-sintered and post-sinter, air-fired states which makes it highly desirable for lamp applications. The transparent YAG ceramic is co-doped with an amount of MgO and an amount of $ZrO_2$ wherein the weight ratio of MgO to $ZrO_2$ is from about 1.5:1 to 3:1.

13 Claims, No Drawings

TRANSPARENT POLYCRYSTALLINE YTTRIUM ALUMINUM GARNET

TECHNICAL FIELD

The present invention relates to ceramic materials for discharge vessels in high-intensity discharge (HID) lamps, e.g., metal-halide lamps and high-pressure sodium lamps. In particular, this invention relates to transparent polycrystalline yttrium aluminum garnet ceramics and discharge vessels made therefrom.

BACKGROUND OF THE INVENTION

Yttrium aluminum garnet (YAG), $Y_3Al_5O_{12}$, ceramics are of interest for use in the manufacture of discharge vessels of HID lamps from both an optical and mechanical standpoint. Unlike the polycrystalline alumina (PCA) ceramics which are prevalent in commercial HID lamps, polycrystalline YAG ceramics have no bi-refringence effect at the grain boundaries and therefore can have a much higher in-line transmittance than PCA. The higher in-line transmittance makes polycrystalline YAG ceramics desirable for short-arc, focused-beam applications such as automotive headlamps and photo-optical lamps. In addition, yttrium aluminum garnet has a cubic symmetry and exhibits isotropic thermal expansion. The isotropic thermal expansion means that there are no residual stresses in the YAG ceramics whereas PCA by comparison has expansion-anisotropy induced residual stresses at the grain boundaries. Also, the elastic constant (Young's modulus) of YAG is about the same as PCA and YAG has a high resistance to creep deformation at elevated temperatures. As a result, YAG ceramics possess a higher mechanical strength (at a given flaw size) than PCA ceramics, especially at high temperatures (>1000° C.).

In order to achieve transparency, dopants are generally required to aid the sintering of compacts of commercially available YAG powders. Of course, it would be best if no sintering aids were used. However, without a sintering aid, it is necessary to use highly active starting powders which are costly to synthesize. The highly reactive powders which have been described in the prior art have a surface area on the order of 15 $m^2/g$ and an average particle size less than 0.5 $\mu m$. See, e.g., Japanese Patent Publication No. 2001-158660A, European Patent Application EP 0 926 106 A1, and *Japan Cer. Soc. Journal*, 98 [3]285–91 (1990). By contrast, commercially available powders generally have a low surface area, less than 5 $m^2/g$, and a average particle size greater than or equal to 1 $\mu m$. More particularly, the surface area ranges from 3.6 to 4.8 $m^2/g$ and the average particle size from 1 to 3 $\mu m$.

For HID lamp applications, the selection of an appropriate sintering aid for making a transparent discharge vessel involves special considerations such as corrosion resistance and stoichiometry stability. The corrosion resistance of YAG and PCA ceramics is affected (1) by the presence of secondary grain boundary phases derived from the dopants, and (2) by the segregation of the dopants to the grain boundaries. For example, it is widely known that an $SiO_2$ additive in PCA would cause the formation of grain-boundary silicate phases which are subject to attack by the corrosive fill materials used in conventional metal halide and high-pressure sodium lamps.

The stoichiometry stability of YAG in a reducing environment, or under ultraviolet radiation, is related to the formation of atomic defects—oxygen vacancies and interstitials—that affect the discoloration behavior. For example, it has been observed that the optical absorption in YAG is a strong function of the oxygen partial pressure in the atmosphere. Very reducing environments typically induce the formation of more oxygen vacancies in YAG. Therefore, YAG ceramics are typically sintered in either vacuum or wet hydrogen. If dry hydrogen is used as the sintering atmosphere, the YAG ceramics become grayish from the oxygen vacancies which are produced. Similarly, lamp tests have shown that YAG discharge vessels become slightly grayish after about 9000 hours of operation in the reducing environment of the lamp.

The stoichiometric stability of these ceramics is also related to the dopants used. For example, MgO-doped YAG that has been sintered in wet hydrogen turns pink-red upon a post-sinter air firing at 1000–1350° C. The pink-red discoloration of the MgO-doped YAG is indicative of the general stoichiometric stability and in particular of the sensitivity of YAG to the partial pressure of oxygen. Thus, the appearance or absence of the pink-red discoloration following the post-sinter air firing can be used as a test to predict performance of a YAG ceramic over the operating life of an HID lamp.

SUMMARY OF THE INVENTION

It is an object of the invention to obviate the disadvantages of the prior art and provide a polycrystalline YAG ceramic material which is transparent and colorless in both the as-sintered and post-sinter, air-fired states.

It is a another object of the invention to provide a sintering aid which allows transparent polycrystalline YAG ceramics to be manufactured from commercially available YAG powders.

In accordance with these and other objects, the present invention involves a co-doping strategy entailing the use of MgO and $ZrO_2$ dopants for sintering transparent polycrystalline YAG ceramics derived from commercially available YAG powders. Charge compensation of the effectively negative charge of $Mg^{+2}$ solute on $Al^{+3}$ site and the effectively positively charge of $Zr^{+4}$ solute on $Y^{+3}$ site allows both the MgO and $ZrO_2$ co-dopants to completely dissolve in the YAG lattice without forming secondary phases or additional oxygen vacancies. Similar co-dopants have been used in PCA, e.g., U.S. Pat. Nos. 4,285,732, 5,625,256, and 5,682,082.

The MgO and $ZrO_2$ co-doped YAG ceramic of this invention is colorless and transparent in both an as-sintered state and a post-sinter, air-fired state. This behavior makes it highly desirable for lamp applications. In terms of the equivalent amounts of the oxides, the YAG ceramic according to this invention contains an amount of MgO in the range from about 200 to about 1000 ppm by weight and an amount of $ZrO_2$ in the range from about 70 to about 660 ppm by weight. Preferably, the amount of MgO is from about 200 to about 500 ppm by weight and the amount of $ZrO_2$ ranges from about 70 to about 330 ppm $ZrO_2$ by weight. Most preferably, the ceramic contains about 350 ppm MgO by weight and about 187 ppm $ZrO_2$ by weight.

In order to achieve colorless and transparent polycrystalline YAG bodies in both states, the preferred ratio of the MgO to $ZrO_2$ dopants is from about 1.5:1 to about 3:1 by weight, and more preferably is about 2:1 by weight. Preferably, the total transmittance of the transparent YAG ceramic at about an 0.8 mm thickness is at least 93% and the in-line transmittance is at least 10% at 600 nm. More preferably, the total transmittance is at least 96% and the in-line transmittance is at least 30% at 600 nm.

DETAILED DESCRIPTION OF THE INVENTION

For a better understanding of the present invention, together with other and further objects, advantages and capabilities thereof, reference is made to the following disclosure and appended claims.

A commercially available phase-pure YAG powder (Shin-Etsu Chemical Co. Ltd., Tokyo, Japan) was used in the following examples. The powder is synthesized by a co-precipitation method and has the following equivalent oxide contents (57.06 wt. % $Y_2O_3$ and 42.94 wt. % $Al_2O_3$). The powder was "phase pure" which is defined herein as having no detectable yttrium aluminate perovoskite ($Y_2O_3$—$Al_2O_3$), corundum ($Al_2O_3$), or yttria ($Y_2O_3$) phases by conventional x-ray diffraction. Phase-purity is important for achieving transparency. Other YAG powders which were not phase pure experienced problems in grain growth control and sintering to transparency. The major impurities in the phase-pure powder as reported by the manufacturer were: <30 ppm $SiO_2$, <10 ppm $Fe_2O_3$, CaO<10 ppm, $Na_2O$<10 ppm, $K_2O$<5 ppm, MgO<5 ppm, and CaO<5 ppm. Glow discharge mass spectrometry (GDMS) further determined that the powder contained: <0.5 ppm Ca, 2.9 ppm Fe, 0.5 ppm Hf, <0.5 ppm K, 0.1 ppm Mg, 3.8 ppm Na, 1.7 ppm Si, and <0.5 ppm Zr. The surface area of the powder was 4.8 $m^2/g$ and the average particle size was 1.59 $\mu$m.

Disks and arc discharge tubes were compacted from the YAG powder. The YAG powder was loaded into a die, uniaxially pressed at 5 ksi, and then isopressed in a wet bag at 25 ksi. Tubes were formed by isopressing in polyurethane bags with steel mandrels at 25 ksi. The YAG disks and tubes were then prefired in air at 900° C. for 2 hours to impart a reasonable mechanical strength for handling. Discharge vessels having a more complex shape were formed by joining two green halves made by injection molding a waxed-based YAG powder mixture. The YAG parts were then de-waxed and prefired. Other methods of shaping such as extrusion, gel-casting, direct coagulation, or slip-casting with or without a fugitive core, could also be utilized.

Dopants were then added to the prefired body by soaking in a doping solution. The doping solution was prepared by dissolving an amount of magnesium nitrate, $Mg(NO_3)_2 \cdot 6H_2O$, and/or an amount of zirconyl nitrate, $ZrO(NO_3)_2$, in deionized water, to provide predetermined concentrations of doping ions. Prefired bodies were immersed in the doping solution, and then placed in a vacuum chamber. A vacuum of about 27 in. Hg was drawn and then the prefired bodies were kept under 15 in. Hg vacuum for about 30 min. Afterwards, the doped, prefired bodies were removed, air dried, and prefired again at 900° C. for 2 hours to convert the nitrates to the corresponding oxides. Although the soaking method for doping was used in the present examples, other methods of adding the dopants may be used including forming a slurry of the YAG powder plus the sintering additives to yield a predetermined composition followed with spray drying to form flowable granules, or adding the sintering aids in the form of organo-metallic compounds to the YAG powder-wax mixture during mixing.

The sintering of the doped, prefired bodies was accomplished in a W-mesh-element, Mo-shield furnace under flowing hydrogen that was bubbled through water to yield a stream hydrogen gas with a dew point of 0° C. The sintering cycle typically consisted of heating to a predetermined temperature (1750–1910° C.) at 15° C./min for a predetermined time and cooling to room temperature at 30° C./min. Wet $H_2$ was introduced into the furnace at 1400° C. during the heating stage.

A series of sintered YAG parts were made with and without the MgO and $ZrO_2$ dopants. Only about half of the YAG parts which were not doped with either MgO or $ZrO_2$ were reasonably transparent after sintering. The total transmittance of these undoped YAG parts ranged from 86.8% to as high as 99.4% with an average of about 92%. The total transmittance was measured in the 400–700 nm wavelength range by placing a miniature incandescent lamp inside the YAG part and measuring the total amount of light transmitted with an integrating sphere. (The average wall thickness of the YAG parts was about 0.8 mm.) The remainder of sintered undoped YAG parts exhibited exaggerated grain growth and were opaque. Undoped YAG powder compacts were sintered to ~94–99% total transmittance at 1857° C. in hydrogen. At sintering temperatures above 1882° C., exaggerated grain growth always occurred. The grain size of the transparent undoped YAG parts that were sintered at 1857° C. for 4 hours was about 5–10 $\mu$m. Even at 1857° C., polished sections of the sintered undoped parts were found to exhibit white spots which are indicative of the beginnings of exaggerated grain growth. These exaggerated grain growth areas (white spots) are thought to be a result of a trace amount of alumina contamination added to the ceramic powder during processing which then caused the formation of a residual $YAlO_3$ phase. As the eutectic temperature of the $YAlO_3$—YAG system is approximately 1850° C., a liquid phase forms above the eutectic temperature which would promote exaggerated grain growth. These examples demonstrate that the YAG parts made without a sintering aid could not be consistently sintered to transparency.

When an MgO dopant alone was used, grain growth was suppressed and a high total transmittance (>96%) was routinely attained. The amount of the MgO dopant in the prefired body was about 700 ppm MgO, based on the weight gain after soaking in the magnesium nitrate solution and prefiring in air. MgO-doped YAG parts sintered at 1857° C. for 4 h had a grain size of about 2–5 $\mu$m, about one half that of the pure YAG parts. Thus, the MgO dopant clearly was beneficial to full densification.

Sinter-HIP experiments were conducted on undoped and MgO-doped YAG parts. Parts were first sintered in wet hydrogen at 1750° C. for one hour to a closed-pore condition, and then hot-isostatically-pressed under 25 ksi argon at 1750° C. for 2 hours. In-line transmittance was measured on polished disks (0.8 mm thick) in a spectrophotometer (Perkin-Elmer Lambda 900). The MgO-doped YAG had a much higher in-line transmittance than the undoped YAG (30% vs. 3% at 600 nm) which again demonstrates the importance of using a sintering aid such as MgO in attaining high transmittance with commercial powders. However, despite the high transmittance, the MgO-doped YAG exhibited undesirable color center behavior. The MgO-doped parts turned to a strong hue of pink-brown during air firing at 1000–1350° C. for 2 hours, whereas the undoped YAG parts exhibited little or only very slight pink-brown discoloration. The pink-brown discoloration decreased total transmittance of the MgO-doped YAG parts by as much as 10–14%. As described previously, the post-sinter air firing is used to check the stoichiometry stability in order to predict the future behavior of the YAG ceramic during the operating life of an HID lamp. The appearance of the discoloration as a result of the post-sinter air firing indicates that the YAG ceramic will not perform well over the life of the lamp.

The use of a $ZrO_2$ dopant alone was also beneficial to sintering the YAG parts to full density, but the as-sintered parts had a strong red color which greatly decreased their transmittance. The red-colored $ZrO_2$-doped YAG parts turned colorless after firing them in air at 1350° C. for 2 hours. However, in the reducing environment of an HID lamp, the red discoloration is likely to reappear making the $ZrO_2$-doped YAG undesirable for lamp applications.

When the MgO and $ZrO_2$ dopants are used in combination, the as-sintered body can be transparent and colorless. Table 1 compares the coloration of as-sintered YAG disks doped with 700 ppm MgO, 748 ppm $ZrO_2$, 700 ppm MgO+748 ppm $ZrO_2$, 350 ppm MgO+374 ppm $ZrO_2$, and 350 ppm MgO+187 ppm $ZrO_2$, respectively. The sintered YAG doped with 350 ppm MgO+187 ppm $ZrO_2$ dopant levels, was colorless, while the disk doped with 350 ppm MgO+374 ppm $ZrO_2$ was red. Thus, the ratio of MgO to $ZrO_2$ is important to attaining an as-sintered YAG body which is both colorless and transparent.

TABLE 1

| Sintering condition (all in wet $H_2$) | Color of as-sintered YAG disks | | | | |
|---|---|---|---|---|---|
| | 350 ppm MgO + 374 ppm $ZrO_2$ | 350 ppm MgO + 187 ppm $ZrO_2$ | 700 ppm MgO + 748 ppm $ZrO_2$ | 700 ppm MgO | 748 ppm $ZrO_2$ |
| 1857° C./4h | pink | clear | pink-red | clear | pink-red |
| 1832° C./4h | pink | clear | — | clear | pink-red |
| 1807° C./4h | pink | clear | — | clear | pink-red |
| 1807° C./1.5h | pink | clear | — | clear | pink-red |

— means experiment not conducted

As shown in Table 2, the sintered YAG disks doped with 350 ppm MgO+187 ppm $ZrO_2$ remained colorless and transparent after firing in air 1350° C. for 2 hours. As-sintered YAG disks doped with 700 ppm MgO, 700 ppm MgO+748 ppm $ZrO_2$, and 350 ppm MgO+374 ppm $ZrO_2$ all became strongly discolored during the air firing at 1350° C. The red-colored, as-sintered YAG doped with 748 ppm $ZrO_2$ became colorless after the air firing. But the $ZrO_2$-doped YAG was already red-colored in the as-sintered state which renders it undesirable for lamp applications.

TABLE 2

| Sintering condition (all in wet $H_2$) | Color of air-fired, sintered YAG disks | | | | |
|---|---|---|---|---|---|
| | 350 ppm MgO + 374 ppm $ZrO_2$ | 350 ppm MgO + 187 ppm $ZrO_2$ | 700 ppm MgO +, 748 ppm $ZrO_2$ | 700 ppm MgO | 748 ppm $ZrO_2$ |
| 1857° C./4h | Pink-brown | clear | Pink-brown | Pink-brown | white |
| 1832° C./4h | Pink-brown | clear | — | Pink-brown | white |
| 1807° C./4h | Pink-brown | clear | — | Pink-brown | white |
| 1807° C./1.5h | Pink-brown | clear | — | Pink-brown | white |

— means experiment not conducted

Tables 1 and 2 show that the 350 ppm MgO+187 ppm $ZrO_2$ co-doped YAG is colorless and transparent in both as-sintered state and in the post-sinter, air-fired state. This uniqueness makes it ideal for lamp applications.

While there has been shown and described what are at the present considered the preferred embodiments of the invention, it will be obvious to those skilled in the art that various changes and modifications may be made therein without departing from the scope of the invention as defined by the appended claims.

I claim:

1. A transparent, sintered ceramic material comprising a polycrystalline yttrium aluminum garnet containing an amount of MgO and an amount $ZrO_2$ wherein the weight ratio of MgO to $ZrO_2$ is from about 1.5:1 to about 3:1.

2. The ceramic material of claim 1 wherein the weight ratio of MgO to $ZrO_2$ is about 2:1.

3. The ceramic material of claim 1 wherein the amount of MgO ranges from about 200 to about 1000 ppm by weight and the amount of $ZrO_2$ ranges from about 70 to about 660 ppm by weight.

4. The ceramic material of claim 1 wherein the amount of MgO ranges from about 200 to about 500 ppm by weight and the amount of $ZrO_2$ ranges from about 70 to about 330 ppm by weight.

5. The ceramic material of claim 1 wherein the amount of MgO is about 350 ppm by weight and the amount of $ZrO_2$ is about 187 ppm by weight.

6. The ceramic material of claim 1 wherein the ceramic material at about an 0.8 mm thickness has a total transmittance between 400–700 nm of at least 93% and an in-line transmittance of at least 10% at 600 nm.

7. The ceramic material of claim 1 wherein the ceramic material at about an 0.8 mm thickness has a total transmittance between 400–700 nm of at least 96% and an in-line transmittance of at least 30% at 600 nm.

8. A transparent, sintered ceramic material comprising polycrystalline yttrium aluminum garnet co-doped with MgO and $ZrO_2$, the ceramic material being colorless and transparent in both an as-sintered state and a post-sinter, air-fired state.

9. The ceramic material of claim 8 wherein the ceramic material at about an 0.8 mm thickness has a total transmittance between 400–700 nm of at least 93% and an in-line transmittance of at least 10% at 600 nm in both states.

10. The ceramic material of claim 8 wherein the ceramic material at about an 0.8 mm thickness has a total transmittance between 400–700 nm of at least 96% and an in-line transmittance of at least 30% at 600 nm in both states.

11. The ceramic material of claim 8 wherein the post-sinter, air-fired state comprises firing the as-sintered ceramic in air at 1000–1350° C. for 2 hours.

12. The ceramic material of claim 11 wherein the ceramic material at about an 0.8 mm thickness has a total transmittance between 400–700 nm of at least 93% and an in-line transmittance of at least 10% at 600 nm in both states.

13. The ceramic material of claim 11 wherein the ceramic material at about an 0.8 mm thickness has a total transmittance between 400–700 nm of at least 96% and an in-line transmittance of at least 30% at 600 nm in both states.

* * * * *